United States Patent [19]
Williams et al.

[11] Patent Number: 5,524,278
[45] Date of Patent: Jun. 4, 1996

[54] METHOD AND APPARATUS FOR DETERMINING A SERVING COMMUNICATION SYSTEM WHERE COMMUNICATION SYSTEMS OPERATE CONJUNCTIVELY

[75] Inventors: James M. Williams, Lombard; Robert F. D'Avello, Lake Zurich; Robert K. Krolopp, Lisle, all of Ill.

[73] Assignee: Motorola, Inc., Schaumburg, Ill.

[21] Appl. No.: 832,092

[22] Filed: Feb. 6, 1992

[51] Int. Cl.$^6$ .................................................. H04Q 7/20
[52] U.S. Cl. ...................... 455/33.4; 455/34.1; 455/166.2
[58] Field of Search .................................. 455/33.4, 32.1, 455/34.1, 34.2, 54.1, 56.1, 166.2; 379/59, 63

[56] References Cited

U.S. PATENT DOCUMENTS

| | | | |
|---|---|---|---|
| 4,775,998 | 10/1988 | Felix et al. | 379/59 |
| 4,775,999 | 10/1988 | Williams | 379/59 |
| 4,799,253 | 1/1989 | Stern et al. | 379/59 |
| 4,850,033 | 6/1989 | Eizenhofer et al. | 455/56 |
| 4,893,327 | 1/1990 | Stern et al. | 379/59 |
| 4,903,320 | 2/1990 | Hanawa | 455/33.1 X |
| 4,972,455 | 11/1990 | Phillips et al. | 379/63 X |
| 5,020,093 | 5/1991 | Pireh | 379/59 |
| 5,119,397 | 6/1992 | Dahlin et al. | 379/59 |
| 5,119,502 | 6/1992 | Kallin et al. | 455/34.2 |
| 5,247,701 | 9/1993 | Comroe et al. | 455/33.4 |
| 5,301,357 | 4/1994 | Thompson | 455/33.4 |

OTHER PUBLICATIONS

"A phone in Every Pocket", M. Kawano & D. De Vaney, *Cellular Business*, (Apr. 1989), pp. 52–58.

Electronic Industries Association (EIA) Standard EIA–553, Engineering Department of the Electronic Industries Association, 2001 Pennsylvania Street, N.W., Washington, D.C., 20006.

*Primary Examiner*—Edward F. Urban
*Attorney, Agent, or Firm*—Jeffrey G. Toler; Kevin A. Buford

[57] ABSTRACT

A method and apparatus is provided for facilitating scanning of radio control channels where a plurality of communication systems conjunctively cover the same area. A subscriber unit receives an overhead message train on a control channel which includes a channel count representing the number of control channels of a communication system. Subsequently, the subscriber unit scans a channel count number of control channels to tune to a control channel being used by a communication system having coverage for the subscriber unit. This scanning of control channels starts with a predetermined start control channel which corresponds to the logical number of the control channel in a sequence of control channels which is after the channel count control channel. In addition, an apparatus may be provided to transmit, in the overhead message train, a subscriber unit control message with an address indicating that a communication system is operating within a coverage area.

24 Claims, 4 Drawing Sheets

METHOD AND APPARATUS FOR DETERMINING A SERVING COMMUNICATION SYSTEM WHERE COMMUNICATION SYSTEMS OPERATE CONJUNCTIVELY

FIELD OF THE INVENTION

The present invention relates to radiotelephone communication systems and, more particularly, to a method and apparatus for determining a serving communication system where two or more radiotelephone communication systems conjunctively cover the same geographical area.

BACKGROUND OF THE INVENTION

Communication systems take many forms. In general, the purpose of a communication system is to transmit information-bearing signals from a source, located at one point, to a user destination, located at another point some distance away. A communication system generally consists of three basic components: transmitter, channel, and receiver. The transmitter has the function of processing the message signal into a form suitable for transmission over the channel. This processing of the message signal is typically referred to as modulation. The function of the channel is to provide a physical connection between the transmitter output and the receiver input. The function of the receiver is to process the received signal so as to produce an estimate of the original message signal. This processing of the received signal is referred to as demodulation.

Two types of two-way communication channels exist, namely, point-to point channels and point-to-multipoint channels. Examples of point-to-point channels include wirelines (e.g., local telephone transmission), microwave links, and optical fibers. In contrast, point-to-multipoint channels provide a capability where many receiving stations may be reached simultaneously from a single transmitter (e.g., cellular radio telephone communication systems). These point-to-multipoint systems are also termed Multiple Access Systems (MAS).

To transmit a message signal (either analog or digital) over a band-pass communication channel, the message signal must be manipulated into a form suitable for efficient transmission over the channel. Modification of the message signal is achieved by means of a process termed modulation. This process involves varying some parameter of a carrier wave in accordance with the message signal in such a way that the spectrum of the modulated wave matches the assigned channel bandwidth. Correspondingly, the receiver is required to recreate the original message signal from a degraded version of the transmitted signal after propagation through the channel. The recreation is accomplished by using a process known as demodulation, which is the inverse of the modulation process used in the transmitter.

In addition to providing efficient transmission, there are other reasons for performing modulation. In particular, the use of modulation permits multiplexing, that is, the simultaneous transmission of signals from several message sources over a common channel. Also, modulation may be used to convert the message signal into a form less susceptible to noise and interference.

For multiplexed communication systems, the system typically consists of many remote units (i.e., subscriber units) which require active service over a communication channel for a short or discrete portion of the communication channel resource rather than continuous use of the resources on a communication channel. Therefore, communication systems have been designed to incorporate the characteristic of communicating between relatively few central communication sites and many remote units for brief intervals on the same communication channel. These systems are termed multiple access communication systems.

One such type of multiple access communication systems is a cellular radiotelephone system. Typical cellular radiotelephone systems have a comparatively large number of radio channels available which, further, can be effectively multiplied by reuse of the radio channels in a geographical area, such as the metropolitan area of a large city like Chicago, by dividing the radio coverage area into smaller coverage areas called "cells" using relatively low power transmitters and coverage restricted receivers. Such cellular systems are further described in U.S. Pat. Nos. 3,906,166 and 4,268,722. The limited coverage area enables the radio channels used in one cell to be reused in another cell geographically separated according to a predetermined plan, such as a four cell channel/frequency reuse pattern shown and described in U.S. Pat. No. 4,128,740. In this four cell channel reuse pattern, each cell is assigned a subset of the available radio channels and reuse of the radio channels is accomplished by repeating the pattern through out a geographical area.

A cellular system typically utilizes a pair of radio frequencies for each radio channel in each cell. Each cell is assigned at least one paging/access channel and several voice channels. The paging/access channel is dedicated to controlling the operation of the subscriber units by means of data messages transmitted to and received from the subscriber units. Control functions performed include paging selected subscriber units, receiving requests for service from subscriber units, instructing subscriber units to tune to a voice channel where a conversation may take place, and enabling subscriber registration by which process the subscriber units identify themselves to the system. The data message and radio channel specifications for U.S. cellular radiotelephone systems are set forth in Electronic Industries Association (EIA) Standard EIA-553 (hereinafter "EIA-553"). Copies of EIA-553 may be obtained from the Engineering Department of the Electronic Industries Association at 2001 Pennsylvania Street, N.W., Washington, D.C. U.S.A. 20006. EIA-553 is also known as Advanced Mobile Phone Service (AMPS). Additionally, a similar, but enhanced signaling protocol specification has been proposed to Telecommunication Industry Association (TIA) TR-45 engineering committee, known as Narrow Advanced Mobile Phone Service (NAMPS). Copies of this proposal may also be obtained from the Engineering Department of the Electronic Industries Association at 2001 Pennsylvania Street, N.W., Washington, D.C. U.S.A. 20006.

A cellular system can grow by adding more voice channels to existing cells, subdividing existing cells into smaller cells and adding new cells until the call switching capacity of the cellular system control terminal is consumed, or until the traffic density limit inherent in the particular channel reuse pattern is reached. At that point, additional switching capacity is required for further growth, or a different channel reuse pattern must be adopted. Alternatively, additional communication systems can be overlaid onto portions of the previous communication system coverage area to add new services and features for subscribers while accommodating the pre-existing population of subscribers. These additional communication systems can also relieve some of the communication traffic congestion by serving subscriber units which are adapted for use in the previous communication system and the overlaid additional communication systems. However, such enhanced subscriber units optimally will need to be able to operate in the previous as well as the added communication systems. Accordingly, there is a need for an improved method and apparatus for determining a serving communication system where two or more radiotelephone communication systems conjunctively cover the same geographical area to allow subscriber units capable of operating in either communication system to preferentially select one communication system over the other communication system when both are available to the subscriber unit at a particular location.

SUMMARY OF THE INVENTION

A method and apparatus is provided for facilitating scanning of radio control channels where a plurality of communication systems conjunctively cover the same area. A subscriber unit receives an overhead message train on a control channel which includes a channel count representing the number of control channels of a communication system. Subsequently, the subscriber unit scans a channel count number of control channels to tune to a control channel being used by a communication system having coverage for the subscriber unit. This scanning of control channels starts with a predetermined start control channel which corresponds to the logical number of the control channel in a sequence of control channels which is after the channel count control channel. In addition, an apparatus may be provided to transmit, in the overhead message train, a subscriber unit control message with an address indicating that a communication system is operating within a coverage area.

DETAILED DESCRIPTION

Figure 1:
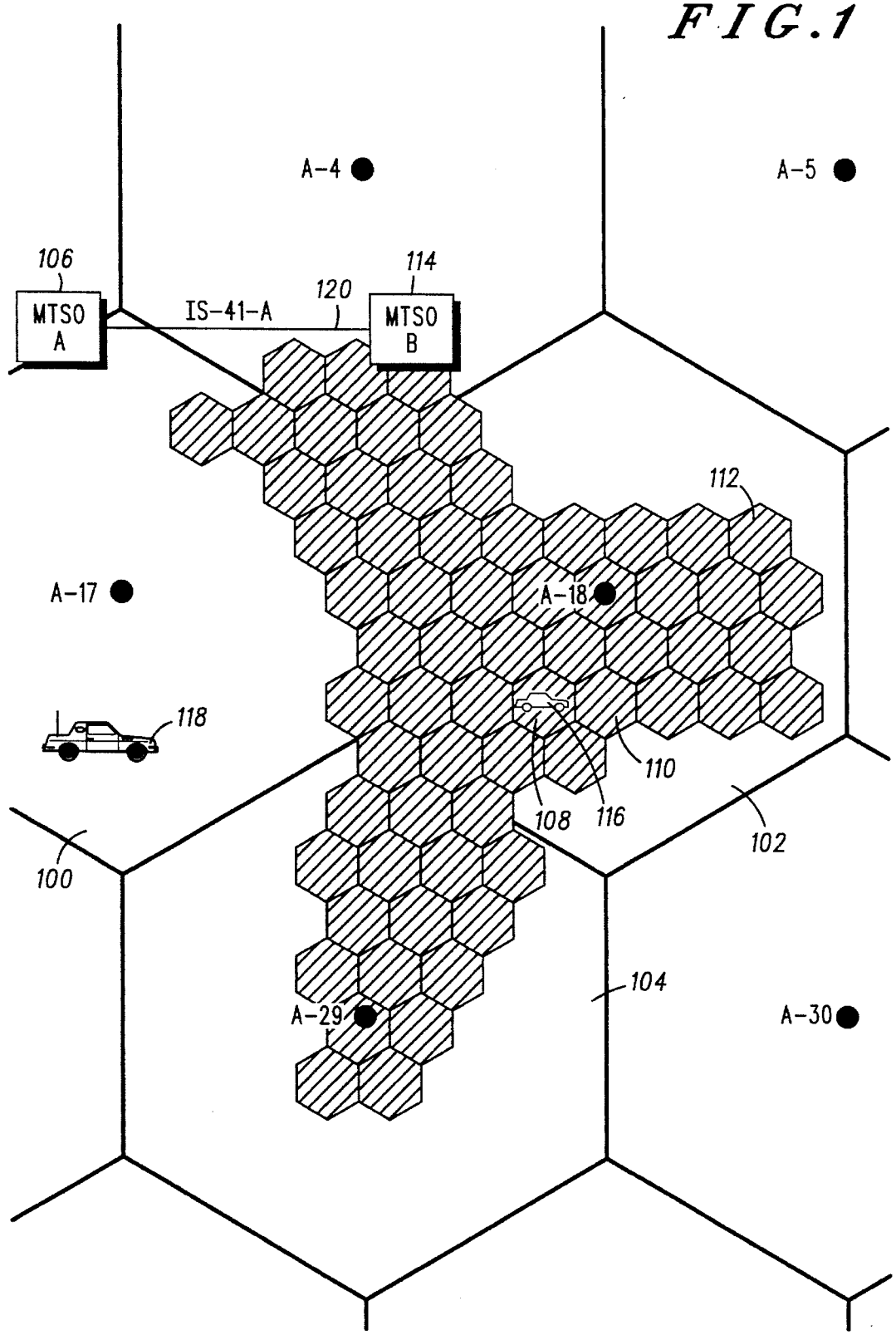
FIG. 1 is a block diagram showing a preferred embodiment having conjunctive communication systems.
Figure 4:
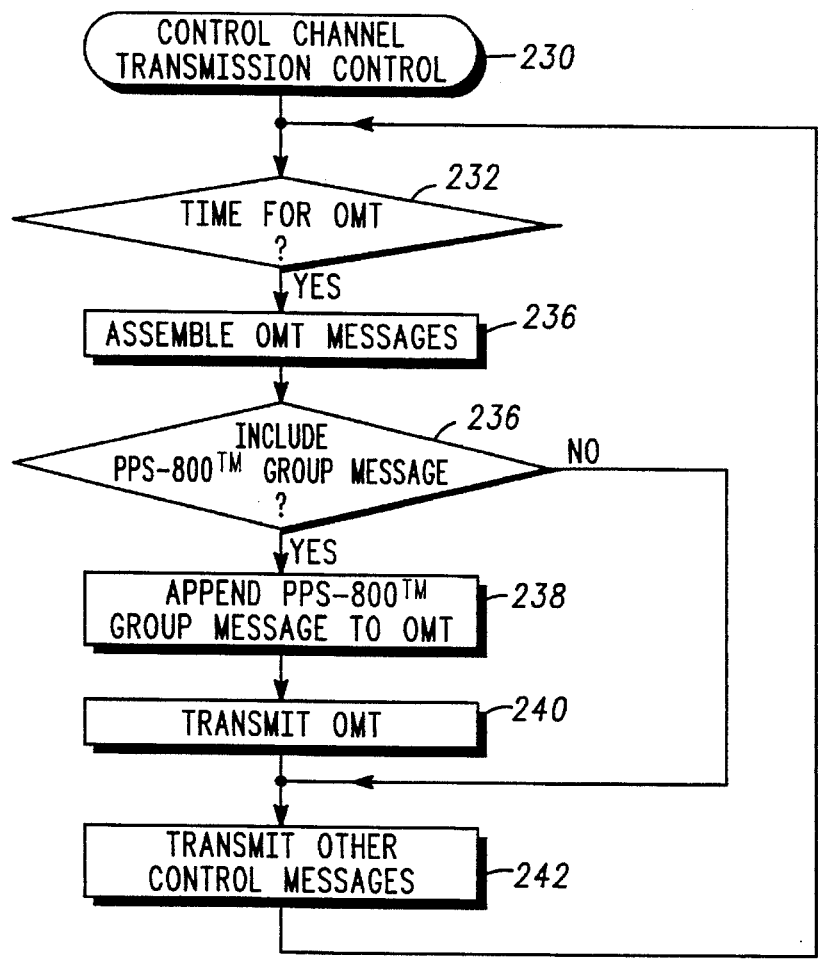
FIG. 4 is a flowchart detailing a preferred embodiment facilitation of a subscriber units initialization operation.

Referring now to FIG. 1, a preferred embodiment having conjunctive communication systems. One such environment is the Motorola Personal Phone Service concept for the 800 MHz cellular communication system bands (PPS™800). In this environment, the pre-existing system, designated System A, serves subscriber equipment conforming to the AMPS technology. The new PPS™800 system, designated System N, requires dual mode subscriber equipment capable of conforming to either AMPS macro-cell technology and NAMPS micro-cell technology.

The large cells (e.g., cells 100, 102 and 104) represent the "previous" or first system utilizing AMPS technology. These cells are all controlled by a pre-existing Mobile Telephone Switching Office 106 (MTSO), designated MTSO-A. The smaller "microcells" (e.g., 108, 110, and 112) represent the "second" system in which the traffic channels are structured according to NAMPS technology. They are controlled by an MTSO 114, designated MTSO-N. Subscriber units 116 of the System N (PPS™-800 subscriber units) must be assigned telephone numbers that can be distinguished from those of the System A system subscriber units 118 so that the public switched telephone network (PSTN) will route incoming calls for the System N subscriber units 116 to MTSO-N 114 and calls for the System A subscriber units 118 to MTSO-A 106. The two MTSOs preferably are capable of interworking by means of an intersystem operations protocol 120, such as EIA/TIA standard IS-41-A, suitable for inter-system hand-off and automatic roaming. Copies of EIA/TIA standard IS-41-A may be obtained from the Engineering Department of the Electronic Industries Association at 2001 Pennsylvania Street, N.W., Washington, D.C. U.S.A. 20006. Because the operation of the two communication systems occurs in the same place and at the same time, the operational configuration is termed "conjunctive". Operation of communication systems in this preferred embodiment "conjunctive" arrangement provides a solution to the basic problem of determining a serving communication system where two or more radiotelephone communication systems conjunctively cover the same geographical area.

In one preferred embodiment, the conjunctive operation only requires those capabilities that are normally expected to be available in systems adhering to AMPS technology. Special (non-standard) variations in the PPS™800 subscriber unit's 116 algorithm for scanning control channels are also minimal. In this embodiment, subscriber units 118 which operate only in System A do not appear in System N. In contrast, the subscribers of System N must be equipped with dual mode subscriber units 116 that can operate either with the PPS™800 cells (e.g., cells 108, 110, and 112) or with the AMPS cells (e.g., 102, 104, and 104) of the System A.

Furthermore, the signaling channels must be arranged so that when a subscriber unit is turned on:

System A type subscriber units 118 will attach themselves only to paging and control channels operated by MTSO-A 106; and System N type subscriber units 116 will attach themselves to a paging and control channel operated by MTSO-N 114 when in the RF coverage area of an "N" system microcell (e.g., cell 108) and to a channel of a cell (e.g., cell 102) operated by MTSO-A 106 if not.

Figure 2:
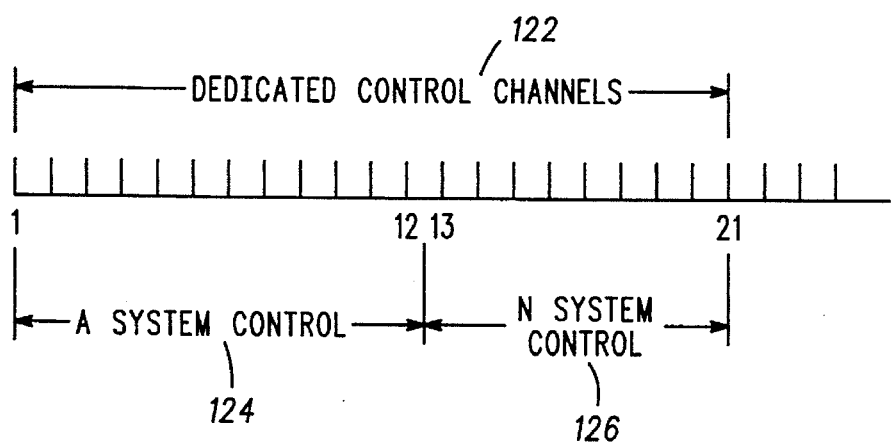
FIG. 2 is a block diagram showing a preferred embodiment control channel configuration.

FIG. 2 illustrates how the twenty-one Dedicated Control Channels 122 (DCCs) specified in the AMPS standard (EIA-553) may be apportioned between the two systems to effect the results indicated above. Each of the AMPS cells (e.g., cells 100, 102, and 104) is assigned a DCC 124 in the range of logical channel 1 to 12. It will be appreciated by those skilled in the art that the logical channel correspond to frequencies licensed to a cellular communication system operator (e.g., beginning at 834 Megahertz and going upward in frequency or beginning at 833 Megahertz and going downward in frequency). This use of logical channels 1 to 12 allows the control channels 124 to be reused according to a 12-cell channel reuse pattern which is suitable for omni-directional control channel antennas. Cells in System N (e.g., cells 108, 110, and 112) are assigned control channels 126 in the range of logical channels 13 to 21 which are above or below the System A control channels 124 in frequency. Although this is only nine channels 126, there are many instances in which this may be enough. If not, an additional three "voice" channels, just beyond the $21^{st}$ DCC 126, may be appropriated for control channel use so that a 12-cell re-use of control channels may be applied in System N as well. Both systems must transmit the same System Identifier (SID), as defined in the AMPS standard (EIA-553), on all deployed control channels. Additionally the subscriber units of all home subscribers, for both System A and System N, must be programmed with that as their "HOME" system ID.

With these arrangements in mind, the control channel scanning procedures specified in the AMPS standard (EIA-553) may be examined. These procedures apply to all AMPS subscriber units and include three different kinds of control channel scans, two of which are associated with subscriber units initialization at power-on. They may be described as follows.

Figure 3:
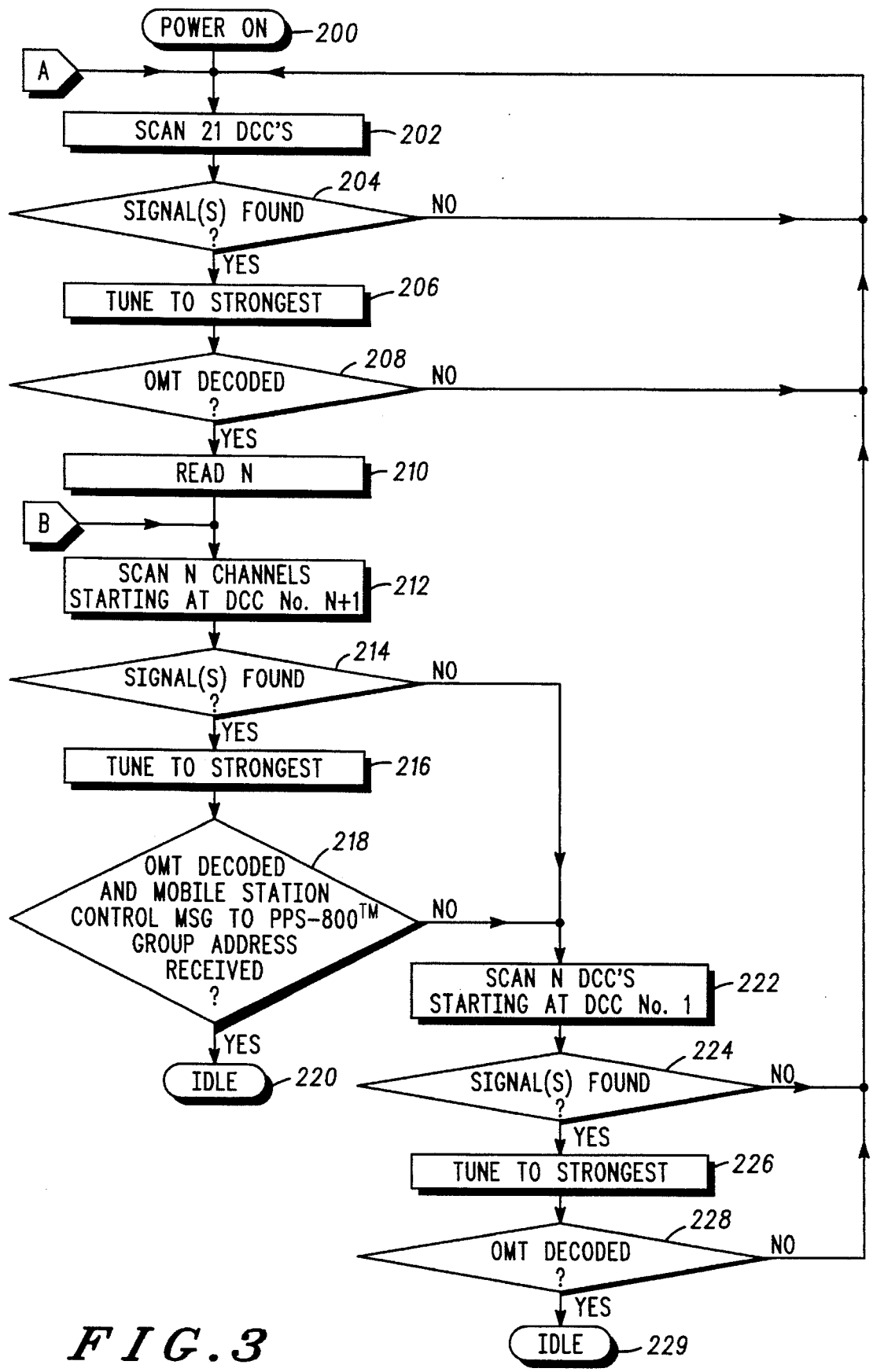
FIG. 3 is a flowchart detailing a preferred embodiment initialization operation of a subscriber unit.
Figure 5:
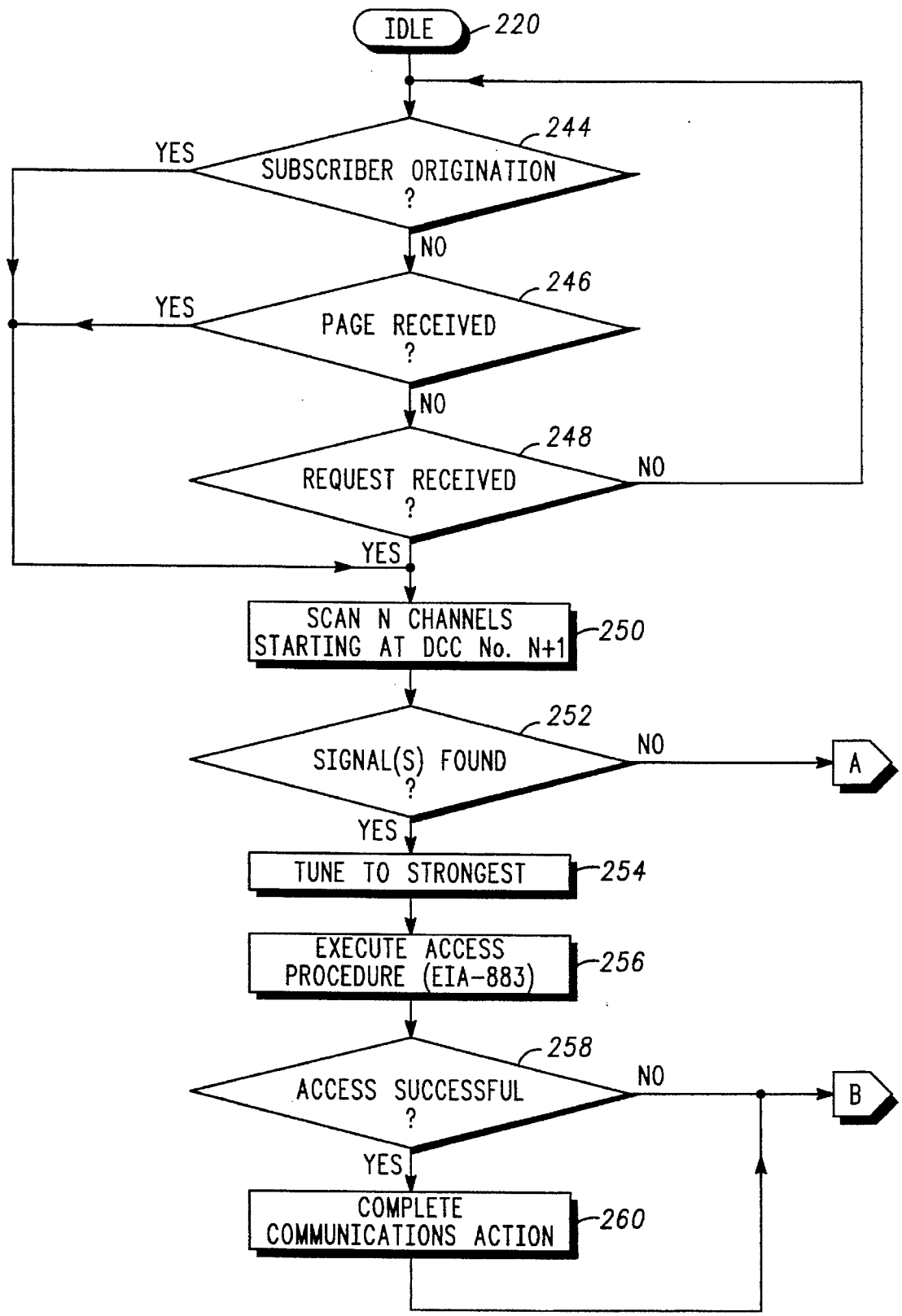
FIG. 5 is a flowchart detailing a preferred embodiment communication system access by a subscriber unit.

Referring now to FIG. 3, the first scan, an example of which begins at element 202, occurs immediately upon subscriber unit 118 power-on 200. Its purpose is to determine the presence of cellular system radio coverage and it involves a quick sampling 202 of all twenty-one DCC frequencies 122. If one or more signals are found 204, the subscriber unit 118 tunes 206 to the strongest and receives an Overhead Message Train 208 (OMT). The OMT contains a variety of information about the system and is transmitted on every control channel roughly once each second. Among the information provided is the parameter "$N_p$," 210, a count of the number of paging channels provided in the system. $N_p$ is controlled by the system operator and in conjunctive systems is preferably set to twelve.

The second scan, an example of which appears in FIG. 3 beginning at element 222, occurs immediately after the first scan 202. Its 222 purpose is to identify 224 and tune 226 to the paging channel being transmitted by the cell with the best RF coverage at the subscriber unit's 118 location. $N_p$ channels are sampled starting with "FIRSTCHP". FIRSTCHP is a parameter programmed in the subscriber unit's 118 internal memory which corresponds to the first control channel from which to start the paging. In a typical AMPS subscriber unit 118, it is set to indicate DCC logical channel #1. When this scan 222 has been successfully completed, the subscriber unit 118 enters the "IDLE" state 229 and remains tuned to the selected paging channel where it continues to monitor overhead messages and paging messages for incoming calls.

The third scan, an example of which is not shown but is found in the AMPS standard, occurs when the terminal seeks to access the system. A system access may be for originating a call, to respond to a received page or for the purpose of conducting a registration transaction. This scan ensures that the access is via the best possible cell. $C_{max}$ number of channels are sampled starting with FIRSTCHA. $C_{max}$ is another parameter transmitted by the System A in the OMT and in conjunctive systems is also preferably set to 12. FIRSTCHA is determined by the procedures specified in EIA-553 and for conjunctive systems will be DCC #1 (combined paging and access channels). Once the proper control channel is selected, the access proceeds as specified in EIA-553.

The "Initialization Scans" described above are repeated after each system access, whenever the selected Paging Channel no longer provides a usable signal, and every few minutes, according to internal programming of the subscriber unit 118.

On its first scan, an AMPS Subscriber unit 118 (see FIG. 1) will presumably find the DCC associated with cell A-17. The control channels associated with the nearest microcells, although proximate, are assumed to be weaker because the microcells operate at very low power. On the other hand, if a subscriber unit 118 is co-located with subscriber unit 116, the control channel associated with the microcell 108 would be selected. In either case, however, the value of $N_p$ contained in the OMT would preferably be 12. On the second scan, then, the AMPS subscriber would sample just the first 12 of the DCCs, which are only assigned to System A cells, and would always settle on A-17 or A-18, respectively, as its serving cell. For system access, the range of control channels to be scanned would be the same as for Paging Channels, that is logical channels 1 through 12.

The first scan for System N subscriber units 116 is identical with that described for AMPS subscriber units 118 with reference to FIG. 3 elements 200–210 and the same result would be obtained at the location of subscriber units 116 or 118. On the second scan 212, however, System N subscriber units 116 are programmed to operate differently than AMPS subscriber units 118. Instead of sampling $N_p$ channels beginning at FIRSTCHP, the System N subscriber units 116 begin their sampling 212 at DCC number $N_p+1$, i.e., they would scan the DCCs 126 or logical channels 13 through 24 which are only assigned to System N microcells (e.g., cells 108, 110, and 112). At the location of subscriber unit 116, the control channel associated with the microcell 108 containing the subscriber unit 116 would be selected as the serving cell. At location of subscriber unit 118, however, no usable channel would be found in the range of logical channels 13 through 24 and the subscriber unit 116 would revert to normal AMPS (EIA-553) operation and scan $N_p$ channels starting with FIRSTCHP which would produce the DCC associated with cell A-17. For system access, the range of control channels to be scanned would be the same as for Paging Channels, 1 through 12 if an AMPS cell were selected and 13 through 24 if a System N cell were selected.

AMPS subscriber units would never appear in System N so that Service Qualification, Call Delivery, etc., would not be required.

System N subscriber units, however, need to be able to operate in System A. Since System A and N are physically separate, System A must treat the System N subscribers as roamers. The Service Qualification, Registration Notification and Call Delivery provisions of IS-41-A may be used for this purpose. Since both systems have the same SID, the registration of a System N subscriber unit each time it attaches itself to the "other" system must be controlled by means of an offset in the values of the Registration Identification (REGID) parameters used by the two systems. The operator must define procedures for establishing and maintaining this offset.

System A type subscriber units are typical AMPS subscriber units and their operation in foreign systems (systems other than the "home" system) is defined by the AMPS standards (EIA-553 and EIA/TIA IS-41-A). System N type subscriber units, however, are programmed for somewhat different scanning procedures than those specified in the AMPS standard (EIA-553). Their operation in the service areas of the "home" (conjunctive) systems has been described above. But, other It is necessary to consider how these System N subscriber units would perform as roamers in other systems. Foreign systems may be classified into two groups: (1) those arranged for conjunctive System A/System N operation, and, (2) non-conjunctive systems.

Assuming that all conjunctive system configurations are set up as described above, a System N subscriber unit would operate in all such systems in essentially the same way. For non-conjunctive systems, however, nothing certain can be said about how such systems might be set up. There are other known purposes—Co-Exchange Operation, for example—for which partitioning of the DCCs is done along lines similar to the case for conjunctive systems. Also, other purposes might well be devised in the future. For this reason, it seems advisable to provide a means to positively identify conjunctive systems to System N subscriber units.

An alternative embodiment of the present invention which provides such identification will now be described. In this embodiment, System N subscriber units can access PPS™ 800 services in any system where they are offered while operating as roaming AMPS portables in all other systems. This embodiment eliminates the possibility of conflict for System N subscriber units operating in systems utilizing special control channel arrangements for purposes other than implementing conjunctive System A/System N operations. This variant requires certain additional capabilities in System N of conjunctive configurations and in the System N subscriber units. These are the "Extended Protocol" provisions described as "optional" in EIA-553/IS-54.

An Extended Protocol Mobile Station Control Message must be defined for indicating conjunctive System A/System N operations and all System N subscriber units must be programmed to respond to the presence or absence of the message. Mobile Station Control Messages are addressed messages directed to a specific Mobile Identification Numbers (MIN) so that a MIN-like "Group Address" must be selected and each System N subscriber unit must be programmed to recognize that MIN in addition to its own unique MIN. The Group Address need not be any real number from the North American Numbering Plan and must not be capable of being assigned as the MIN for any real mobile station. For example, 800-PPS-0800 might serve and would be used in all conjunctive System A/System N operations.

This alternative preferred embodiment is characterized by:

- Sets of control channels for the mutually exclusive use of System A cells and System N cells are defined and deployed. The System N channels 126 may be of any number (Np) and may be located anywhere in the cellular band ($N_p+1-2N_p$).
- Systems configured for conjunctive System A/System N operation must frequently transmit the designated Extended Protocol Mobile Station Control Message on all DCCs. Subscriber units not programmed to respond to this message will ignore it (per EIA-553).
- System N subscriber units first (initialization) scan of DCCs after power-on is per EIA-553/IS-54 as shown in FIG. 3 elements 200–210 and described previously.
- System N subscriber units then scan 212 N channels, beginning at channels to identify 214 and tune to 216 the strongest control channel. Subsequently, if such a control channel for System N is detected, a designated Extended Protocol Mobile Station Control Message is searched for in the OMT 218.
- If the designated Extended Protocol Mobile Station Control Message is not detected in the OMT, the System N subscriber unit performs a second (paging channel) scan according to normal EIA-553 procedures as shown in FIG. 3, element 222–229 and previously described.
- If the designated Extended Protocol Mobile Station Control Overhead Message is received, the System N subscriber unit enters an idle state 220, ready to engage in normal System N activities.

In summary, a communication system apparatus for facilitating scanning of radio control channels wherein a plurality of radio communication systems conjunctively cover the same geographical area is shown in FIGS. 1–5. The communication system apparatus preferably includes a mechanism within the cellular infra-structure for forming a subscriber unit control message 238 with an address indicating that a first communication system is operating within a central communication site coverage area 108. In addition, a mechanism, such as an antenna of a central communication site, transmits the subscriber unit control message address in an overhead message train (OMT) 240 of a control channel of a central communication site. The subscriber unit control message 238 may include one of several types of messages such as an extended protocol message, a page message, an audit message, or a local control message.

In addition, the communication system apparatus preferably includes another communication device such as a subscriber unit 116. This subscriber unit 116 includes a receiving mechanism, such as an antenna, which receives 208 an overhead message train on a radio frequency (RF) control channel. This overhead message train preferably includes a predetermined channel count 210 which represents the number of control channels (N) provided in a communication system. In the preferred embodiment the predetermined channel count is twelve. However, any other number which corresponds to the number of radio control channels in either System A or System N may be selected as the value of the predetermined channel count. Further, a subscriber unit 116 scanning mechanism scans 212 a predetermined channel count number of control channels to identify 214 and tune 216 to the control channel being used by a central communication site of the first communication system (System N) having coverage for the subscriber unit's 116 location. The scanning mechanism also scans 212 of control channels 126 starting with a predetermined start control channel. The predetermined start control channel (N+1) corresponds to the logical number of the control channel in a sequence of dedicated control channels 122 which is after the predetermined channel count control channel (N).

If the scanning mechanism fails to identify and tune 214 to a radio control channel, then the subscriber unit 116 scans 222 a secondary predetermined channel count number of control channels to identify 224 and tune 226 to the control channel being used by a central communication site of a second communication system (System A) having coverage for the subscriber unit's 116 location. The scan 222 of the secondary control channels 124 starts with a predetermined start control channel (typically the first logical number of the control channel in a sequence of control channels).

The communication system apparatus also preferably includes a determining mechanism for detecting 21 8 the presence of a particular subscriber unit control message address in an overhead message train which indicates that the first communication system (System N) is operating at the subscriber unit's 116 location. If the scanning mechanism does identify 214 and tune 216 to a control channel and the determining subsequently fails to detect 21 8 the presence of the particular subscriber unit control message address in an overhead message train, then the communication system apparatus scans 222 a secondary predetermined channel count number of control channels to identify 224 and tune 226 to the control channel being used by a central communication site of a second communication system (System A) having coverage for the subscriber unit's 116 location. The scan 222 of the secondary control channels 124 starts with a predetermined start control channel (typically the first logical number of the control channel in a sequence of control channels).

If the scanning mechanism does identify 214 and tune 216 to a control channel and the determining subsequently does detect 218 the presence of the particular subscriber unit control message address in an overhead message train, then the communication system apparatus sets in an active idle state 220 ready to engage in normal communication system activities. One such normal system activity is accessing the first communication system (System N). The reasons for accessing the first communication system may include consisting essentially of originating a radio communication link 244, responding to a received page 246, or conducting a subscriber unit registration transaction 248. Prior to such accessing, the subscriber unit 116 scans 250 a predetermined channel count number of control channels 126 to identify 252 and tune 254 to the control channel being used by a central communication site of the first communication system (System N) having coverage for the subscriber unit's 116 location. The scanning mechanism also scans 250 control channels 126 starting with a predetermined start control channel. The predetermined start control channel (N+1) corresponds to the logical number of the control channel in a sequence of dedicated control channels 122 which is after the predetermined channel count control channel (N).

Although the invention has been described and illustrated with a certain degree of particularity, it is understood that the present disclosure of embodiments has been made by way of example only and that numerous changes in the arrangement and combination of parts as well as steps may be resorted to by those skilled in the art without departing from the spirit and scope of the invention as claimed. For example, the scanning techniques described above can be readily adapted for use in other signaling protocols such as Total Access Communication System (TACS) and the Japanese Total Access Communication System (JTACS). TACS Mobile Station—Land Station Compatibility Specification was prepared by the Joint Radiophone Interface Group (JRTIG) under the auspices of the U.K. Department of Trade and Industry. Further, it will also be appreciated by those skilled in the art that the operational functions incorporated into the subscriber units and infra-structure elements (e.g., the central communication site and MTSO) can be shifted amongst the various elements without departing from the spirit and scope of the present invention.

What is claimed is:

1. A communication system apparatus for facilitating scanning of radio control channels by first and second groups of subscriber units of which the first group of subscriber units are operable for communicating in a first and a second communication system, and the second group of subscriber units are operable for communicating in the second communication system and nonoperable for communicating in the first communication system, comprising:

(a) means, located at one of the first and second communication systems, for forming a subscriber unit control message with a first subscriber group address indicating to the first group, but not the second group, of subscriber units that the first communication system is operating within a communication site coverage area; and (b) means, located at one of the first and second communication systems, for transmitting the subscriber unit control message with the first subscriber group address and a system identification message in an overhead message train of a control channel which is used by the first and second communication systems.

2. The communication system apparatus of claim 1 wherein the subscriber unit control message comprises a message type selected from the group of message types consisting essentially of: an extended protocol message, a page message, an audit message, and a local control message.

3. The communication system apparatus of claim 1 wherein the first and second radio communication systems conjunctively cover the same geographical area, further comprising:

(a) receiving means for receiving an overhead message train on a control channel, the overhead message train comprising a predetermined channel count which represents the number of control channels provided in the second communication system; and (b) scanning means for scanning a predetermined channel count number of control channels to identify and tune to the control channel being used by a central communication site of the first communication system having coverage for the subscriber unit's location, the scanning means comprising means for scanning of control channels starting with a predetermined start control channel, the predetermined start control channel corresponding to the logical number of the control channel in a sequence of control channels which is after the predetermined channel count control channel.

4. The communication system apparatus of claim 3 further comprising secondary scanning means for scanning another predetermined channel count number of control channels to identify and tune to the control channel being used by a central communication site of the second communication system having coverage for the subscriber unit's location, the secondary scanning means comprising means for scanning of control channels starting with a predetermined start control channel, the predetermined start control channel corresponding to the first logical number of the control channel in a sequence of control channels, if the scanning means fails to identify and tune to a control channel.

5. The communication system apparatus of claim 3 further comprising:

(a) determining means for determining the presence of a particular subscriber unit control message first subscriber group address in an overhead message train which indicates that the first communication system is operating at the subscriber unit's location; and (b) secondary scanning means for scanning another predetermined channel count number of control channels to identify and tune to the control channel being used by a central communication site of the second communication system having coverage for the subscriber unit's location, the secondary scanning means comprising means for scanning of control channels starting with a predetermined start control channel, the predetermined start control channel corresponding to the first logical number of the control channel in a sequence of control channels, if the scanning means does identify and tune to a control channel and the determining means subsequently fails to determine the presence of the particular subscriber unit control message address in an overhead message train.

6. The communication system apparatus of claim 3 further comprising:

(a) determining means for determining the presence of a particular subscriber unit control message first subscriber group address in an overhead message train which indicates that the first communication system is operating at the subscriber unit's location; and (b) secondary scanning means for scanning a predetermined channel count number of control channels, prior to accessing the first communication system, to identify and tune to the control channel being used by a central communication site of the first communication system having coverage for the subscriber unit's location, the secondary scanning means comprising means for scanning control channels starting with a predetermined start control channel, the predetermined start control channel corresponding to the logical number of the control channel in a sequence of control channels which is after the predetermined channel count control channel, if the scanning means does identify and tune to a control channel and the determining means subsequently does determine the presence of the particular subscriber unit control message first subscriber group address in an overhead message train.

7. A subscriber unit for scanning control channels of first and second radio communication systems comprising:

(a) receiving means for receiving an overhead message train on a control channel, the receiving means comprising means for determining if the overhead message train comprises a predetermined channel count which represents a number of control channels provided in the second communication system and is indicative of whether the first communication system conjunctively covers a same geographic area as the second communication system; and (b) scanning means for scanning a predetermined channel count number of first communication system control channels to identify and tune to a first control channel being used by a central communication site of the first communication system having coverage for the subscriber unit's location, the scanning means comprising means for scanning starting with a predetermined start control channel, the predetermined start control channel corresponding to the logical number of a control channel in a sequence of control channels which is after the predetermined channel count control channel.

8. The subscriber unit of claim 7 further comprising secondary scanning means for scanning, if the scanning means fails to identify and tune to said first control channel, another predetermined channel count number of control channels to identify and tune to a second control channel being used by a central communication site of the second communication system having coverage for the subscriber unit's location, the secondary scanning means comprising means for scanning of control channels starting with a predetermined second start control channel, the predetermined second start control channel corresponding to the first logical number of a control channel in a second sequence of control channels.

9. The subscriber unit of claim 7 further comprising:

(a) determining means for determining the presence of a particular subscriber unit control message address in an overhead message train which indicates that the first communication system is operating at the subscriber unit's location; and (b) secondary scanning means for scanning, if the scanning means does identify and tune to said first control channel and the determining means subsequently fails to determine the presence of the particular subscriber unit control message address in an overhead message train, another predetermined channel count number of control channels to identify and tune to a second control channel being used by a central communication site of the second communication system having coverage for the subscriber unit's location, the secondary scanning means comprising means for scanning of control channels starting with a predetermined second start control channel, the predetermined second start control channel corresponding to the first logical number of a control channel in a second sequence of control channels.

10. The subscriber unit of claim 7 further comprising:

(a) determining means for determining the presence of a particular subscriber unit control message address in an overhead message train which indicates that the first communication system is operating at the subscriber unit's location; and (b) secondary scanning means for scanning a predetermined channel count number of control channels, prior to accessing the first communication system, to identify and tune to the control channel being used by a central communication site of the first communication system having coverage for the subscriber unit's location, the secondary scanning means comprising means for scanning control channels starting with a predetermined start control channel, the predetermined start control channel corresponding to the logical number of the control channel in a sequence of control channels which is after the predetermined channel count control channel, if the scanning means does identify and tune to a control channel and the determining means subsequently does determine the presence of the particular subscriber unit control message address in an overhead message train.

11. The subscriber unit of claim 10 wherein accessing of the communication system has an underlying subscriber unit reason selected from the group of subscriber unit reasons consisting essentially of originating a radio communication link, responding to a received page, and conducting a subscriber unit registration transaction.

12. The subscriber unit of claim 7 wherein the predetermined channel count is twelve.

13. The subscriber unit of claim 7 wherein the subscriber unit is operationally configured to identify and evaluate signaling protocols from the group consisting essentially of Advanced Mobile Phone Service (AMPS), Narrow Advanced Mobile Phone Service (NAMPS), Total Access Communication System (TACS), Japanese Total Access Communication System (JTACS).

14. A method for facilitating scanning of radio control channels by a first group of subscriber units operable for communicating in both a first and a second communication system and a second group of subscriber units operable for communicating in the second communication system and nonoperable for communicating in the first communication system comprising the steps of:

(a) forming a subscriber unit control message with a first subscriber group address indicating to the first group, but not the second group, of subscriber units that the first communication system is operating within a communication site coverage area; and (b) transmitting the subscriber unit control message with the first subscriber group address and a system idenfication message in an overhead message train of a control channel used by the first and second communicating systems.

15. The method of claim 14 wherein the subscriber unit control message comprises a message type selected from the group of message types consisting essentially of: an extended protocol message, a page message, an audit message, and a local control message.

16. The method of claim 14 wherein the first and a second communication systems conjunctively cover the same geographical area, further comprising the steps of:

(a) receiving an overhead message train on a control channel at a subscriber unit, the overhead message train comprising a predetermined channel count which represents the number of control channels provided in the second communication system; and (b) scanning a predetermined channel count number of control channels to identify and tune to the control channel being used by a central communication site of the first communication system having coverage for the subscriber unit's location, the scanning of control channels starting with a predetermined start control channel, the predetermined start control channel corresponding to the logical number of the control channel in a sequence of control channels which is after the predetermined channel count control channel.

17. The method of claim 16 further comprising the step of:

(c) scanning another predetermined channel count number of control channels to identify and tune to a second control channel being used by a central communication site of the second communication system having coverage for the subscriber unit's location, the scanning of said another predetermined channel count number of control channels starting with a predetermined second start control channel, the predetermined second start control channel corresponding to the first logical number of the control channel in a second sequence of control channels, if the subscriber unit fails to identify and tune to a control channel during the previous scanning step (b).

18. The method of claim 16 further comprising the step of:

(c) scanning another predetermined channel count number of control channels to identify and tune to a second control channel being used by a central communication site of the second communication system having coverage for the subscriber unit's location, the scanning of said another predetermined channel count number of control channels starting with a predetermined second start control channel, the predetermined second start control channel corresponding to the first logical number of the control channel in a second sequence of control channels, if the subscriber unit fails to identify and tune to a control channel during the previous scanning step (b) and subsequently fails to receive a particular subscriber unit control message address in an overhead message train which indicates that the first communication system is operating at the subscriber unit's location.

19. A method of scanning control channels where first and second radio communication systems for use by first and second groups of subscriber units, of which only the first group of subscriber units are operable for communicating in the first communication system, comprising:

(a) receiving an overhead message train on a control channel at a subscriber unit, and determining if the overhead message train comprises a predetermined channel count which represents a number of control channels provided in the second communication system and is indicative of whether the first communication system conjunctively covers a same geographic area as the second communication system; and (b) scanning a predetermined channel count number of first communication system control channels by the subscriber unit to identify and tune to a first control channel being used by a central communication site of the first communication system having coverage for the subscriber unit's location, the scanning starting with a predetermined start control channel, the predetermined start control channel corresponding to the logical number of a control channel in a sequence of control channels which is after the predetermined channel count control channel.

20. The method of claim 19 further comprising the step of:

(c) scanning another predetermined channel count number of control channels to identify and tune to a second control channel being used by a central communication site of the second communication system having coverage for the subscriber unit's location, the scanning of another predetermined channel count number of control channels starting with a predetermined second start control channel, the predetermined second start control channel corresponding to the first logical number of a control channel in a second sequence of control channels, if the subscriber unit fails to identify and tune to said first control channel during the previous scanning step (b).

21. The method of claim 19 further comprising the step of:

(c) scanning another predetermined channel count number of control channels to identify and tune to a second control channel being used by a central communication site of the second communication system having coverage for the subscriber unit's location, the scanning of another predetermined channel count number of control channels starting with a predetermined second start control channel, the predetermined second start control channel corresponding to the first logical number of control channel in a second sequence of control channels, if the subscriber unit does identify and tune to a control channel during the previous scanning step (b) and subsequently fails to receive a particular subscriber unit control message address in an overhead message train which indicates that the first communication system is operating at the subscriber unit's location.

22. The method of claim 19 wherein accessing of the communication system has an underlying subscriber unit reason selected from the group of subscriber unit reasons consisting essentially of originating a radio communication link, responding to a received page, and conducting a subscriber unit registration transaction.

23. The method of claim 19 wherein the predetermined channel count is twelve.

24. The method of claim 19 wherein the subscriber unit is operationally configured to identify and evaluate signaling protocols from the group consisting essentially of Advanced Mobile Phone Service (AMPS), Narrow Advanced Mobile Phone Service (NAMPS), Total Access Communication System (TACS), Japanese Total Access Communication System (JTACS).

* * * * *